US012803237B2

(12) United States Patent
Cheung et al.

(10) Patent No.: US 12,803,237 B2
(45) Date of Patent: Nov. 17, 2026

(54) OPTICAL DEVICE HAVING UNIDIRECTIONAL MICRORING RESONATOR LASER CAPABLE OF SINGLE-MODE OPERATION

(71) Applicant: Hewlett Packard Enterprise Development LP, Spring, TX (US)

(72) Inventors: Stanley Cheung, Milpitas, CA (US); Wayne Victor Sorin, Milpitas, CA (US); Yuan Yuan, Milpitas, CA (US); Raymond G. Beausoleil, Milpitas, CA (US); Di Liang, Santa Barbara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1084 days.

(21) Appl. No.: 17/937,071

(22) Filed: Sep. 30, 2022

(65) Prior Publication Data

US 2024/0113490 A1 Apr. 4, 2024

(51) Int. Cl.
*H01S 3/083* (2006.01)
*H01S 3/08022* (2023.01)
(Continued)

(52) U.S. Cl.
CPC .......... *H01S 3/083* (2013.01); *H01S 3/08027* (2013.01); *H01S 3/08031* (2013.01);
(Continued)

(58) Field of Classification Search
CPC ... H01S 3/083; H01S 3/08027; H01S 3/08031
See application file for complete search history.

(56) References Cited

U.S. PATENT DOCUMENTS 6,631,019 B1 10/2003 Vujkovic-Cvijin et al.
6,816,517 B2 11/2004 Jacobowitz et al.
(Continued)

FOREIGN PATENT DOCUMENTS

WO 2014/021781 A1 2/2014
WO 2021/122787 A1 6/2021

OTHER PUBLICATIONS

D. Liang et al. "Teardrop Reflector-Assisted Unidirectional Hybrid Silicon Microring Lasers." IEEE Photonics Technology Letters 24 (2012) (Year: 2012).*
(Continued)

*Primary Examiner* — Xinning(Tom) Niu
(74) *Attorney, Agent, or Firm* — Hewlett Packard Enterprise Patent Department

(57) ABSTRACT

Examples described herein relate to an optical device. The optical device includes a first microring resonator (MRR) laser having a first resonant frequency and a first free spectral range (FSR). The first FSR is greater than a channel spacing of the optical device. Further, the optical device includes a first frequency-dependent filter formed along a portion of the first MRR laser via a common bus waveguide to attenuate one or more frequencies different from the first resonant frequency. A length of the common bus waveguide is chosen to achieve a second FSR of the common bus waveguide to be substantially equal to the channel spacing to enable a single-mode operation for the optical device. Moreover, the optical device includes a first reflector formed at a first end of the common bus waveguide to enhance a unidirectionality of optical signal within the first MRR laser.

18 Claims, 5 Drawing Sheets

(51) Int. Cl.

| | |
|---|---|
| ***H01S 3/08031*** | (2023.01) |
| ***H01S 3/10*** | (2006.01) |
| ***H01S 3/106*** | (2006.01) |
| ***H01S 3/107*** | (2006.01) |

(52) U.S. Cl.

CPC ........ *H01S 3/10053* (2013.01); *H01S 3/1062* (2013.01); *H01S 3/107* (2013.01)

(56) References Cited

U.S. PATENT DOCUMENTS

| | | | | |
|---|---|---|---|---|
| 6,978,059 | B2 | 12/2005 | Martin, Jr. et al. | |
| 2001/0015837 | A1 | 8/2001 | Hung | |
| 2002/0018507 | A1* | 2/2002 | Deacon | G02B 6/136 372/20 |
| 2002/0106146 | A1 | 8/2002 | Lauder et al. | |
| 2003/0219045 | A1* | 11/2003 | Orenstein | H01S 5/1032 372/20 |
| 2005/0196103 | A1* | 9/2005 | Kaplan | G02B 6/12007 385/39 |
| 2012/0063719 | A1 | 3/2012 | Chomycz et al. | |
| 2014/0110572 | A1* | 4/2014 | Li | G02F 1/025 250/227.23 |
| 2014/0185980 | A1 | 7/2014 | Lei et al. | |
| 2017/0139237 | A1* | 5/2017 | Luo | H01S 5/50 |
| 2020/0409001 | A1 | 12/2020 | Liang et al. | |
| 2021/0288461 | A1* | 9/2021 | Suzuki | H01S 5/142 |

OTHER PUBLICATIONS

Liang et al., "Heterogeneous silicon light sources for datacom applications", Optical Fiber Technology 44, 2018, 10 pages.

Liang et al., "Teardrop Reflector-Assisted Unidirectional Hybrid Silicon Microring Lasers", IEEE Photonics Technology Letters 24(22), 1988-1990.

* cited by examiner

OPTICAL DEVICE HAVING UNIDIRECTIONAL MICRORING RESONATOR LASER CAPABLE OF SINGLE-MODE OPERATION

STATEMENT OF GOVERNMENT RIGHTS

This invention was made with Government support under Agreement Number H98230-18-3-0001. The Government has certain rights in the invention.

BACKGROUND

Optical systems include optical devices that can generate, process, and/or carry optical signals from one point to another point. In certain implementations, optical systems such as optical communication systems may facilitate data communication over longer distances with higher bandwidth using smaller cable width (or diameter) in comparison to communication systems using electrical wires. In an optical communication system, light may be generated by a light source such as a laser. In certain applications, for example, Dense Wavelength Division Multiplexing (DWDM) optical transmitters, multiple lasers are used to generate light for optical communication. With the use of multiple lasers for a common transmitter, the chance of interferences of the light increases which degrades the performance of an optical system using such light sources.

BRIEF DESCRIPTION OF THE DRAWINGS

Various examples will be described below with references to the following figures.

Figure 1:
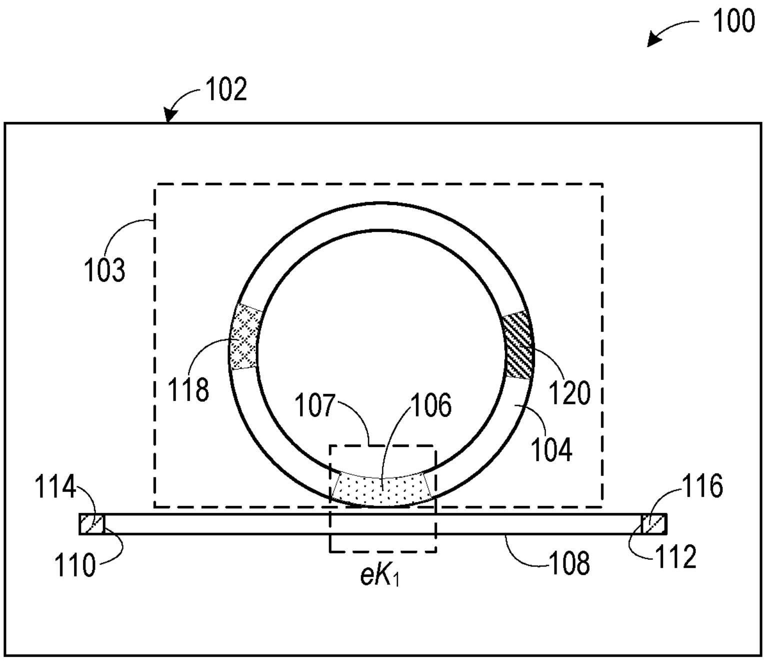
FIG. 1 depicts an example optical device.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Light sources, such as lasers, are widely used optical components in optical systems, especially, optical transmitters. For example, an optical transmitter includes a laser that generates light which may be modulated by information signals using an optical modulator. The modulated light may be transmitted to an optical receiver via optical fiber cables or an integrated waveguide. In the recent state of technology, microring resonator (MRR) lasers have become popular due to their simple construction, less complex fabrication, and applicability in a variety of optical applications. An MRR laser typically includes an MRR cavity and a light emitting layer (for example, made of quantum dot and/or quantum well materials) formed annularly over the microring cavity. The light generated via the light-emitting layer couples inside the MRR cavity and resonates within the MRR cavity.

Although the MRR lasers are widely used in optical systems, the MRR lasers still face challenges in producing good quality light. For instance, some of the challenges that the MRR lasers face are multi-mode behavior and bi-directional behavior. For the production of good quality light by the MRR laser, it is useful to minimize or suppress the multi-mode and bi-directional behaviors.

The multi-mode behavior of an MRR laser is generally caused by the presence of two or more prominent frequencies (or wavelengths) with high magnitude/intensity that are closely located in a given frequency range. As a result of the presence of multiple prominent frequencies (or wavelengths) in the given frequency range, the MRR laser may operate as producing multiple frequency/wavelength light. In some instances, the light of certain frequencies may appear close to a resonant frequency of the MRR laser, leading to a phenomenon called mode-hopping in which optical power can switch randomly from one frequency to another frequency uncontrollably. As it is understood, due to the mode hopping, the output of the MRR laser may become unstable (i.e., with output light that is not fixed at a particular frequency). Such an unstable operation of the MRR laser may impact the operation and accuracy of the signal detection at optical receivers receiving optical data from optical transmitters using such unstable MRR lasers.

Further, as the MRR lasers use an annular (e.g., MRR) waveguide (also generally referred to as a cavity), light can propagate in a clockwise direction or a counterclockwise direction. This bi-directional propagation of the light in the cavity is referred to as bi-directionality. The bi-directionality in an MRR can cause gain switching of counter-propagating laser signals which again results in unstable output powers for a given injection current. The term "injection current" refers to a current that is passed through the MRR laser to generate light output. In particular, due to the bi-directional propagation of light in the cavity of the MRR laser, optical power for a given injection current becomes unstable (i.e., different from what is expected at the given injection current). This may also impact the operation and accuracy of the signal detection at optical receivers receiving optical data from optical transmitters using such unstable MRR lasers.

An existing solution attempted to overcome the bi-directional propagation of the light in an MRR laser by placing a reflector at one end of a bus waveguide placed proximate to an MRR cavity. By using the reflector at the end of the bus waveguide, light propagating inside the MRR cavity in a clockwise direction may be forced to propagate in a counterclockwise direction. However, the existing solution continues to suffer from a multi-mode operation and resulting issues such as mode hopping and mode competition.

In accordance with examples consistent with the proposed disclosure, an enhanced optical device is presented that may obviate or minimize both the issues of the multi-mode behavior and bi-directional behavior in an MRR laser. In one example, the proposed example optical devices use frequency-dependent coupled cavity filters, hereinafter also referred to as frequency-dependent filters, and reflectors to achieve both unidirectionality and single-wavelength operation of the optical device. In particular, in one example, the proposed optical device may be a laser source that may include an MRR laser and a frequency-dependent filter formed along a portion of the MRR laser. The frequency-dependent filter may be realized via an optical coupler formed using a common bus waveguide. In particular, the optical coupler may refer to a region of the optical device where the light generated by the MRR laser evanescently couples into the common bus waveguide. The common bus waveguide may be formed proximate to the MRR laser such that the optical coupler has a pre-determined coupling coefficient. Depending on the pre-determined coupling coefficient of the optical coupler between the MRR laser and the common bus waveguide and the resonance condition of the light in the common bus waveguide, the frequency-dependent filter may filter out certain light generated by the MRR laser and couple the rest of the light into the common bus waveguide. In particular, the frequency-dependent filter may filter (i.e., attenuate) the frequencies other than a resonant frequency of the MRR laser. Accordingly, the light coupled into the common bus waveguide may have light having prominently the resonant frequency with other frequencies attenuated. In some other examples, the proposed optical device is envisioned to use more than one frequency-dependent filter to enhance the attenuation of frequencies other than the resonant frequency.

Moreover, the MRR laser is designed (e.g., by selecting specific dimensions, such as the diameter of the MRR laser) to achieve a first free spectral range (FSR). Further, the common bus waveguide may be designed (e.g., by selecting a suitable length) to achieve a second FSR of the common bus waveguide. A free spectral range (also referred to as axial mode spacing) for a medium (e.g., the MRR laser or the common bus waveguide) is a frequency spacing between two adjacent maxima (e.g., optical modes) in a frequency spectrum of the light in the medium. In accordance with examples of the present disclosure, the MRR laser may be designed to achieve the first FSR greater than a channel spacing of the optical device, and the common bus waveguide is designed to achieve the second FSR that is substantially equal to the channel spacing. The channel spacing is a difference in frequency between two communication channels in an optical system. For example, in a transmitter using a comb-laser source, the channel spacing may be the difference between the operating frequencies of adjacent MRR lasers.

By way of example, the MRR laser in the optical device may be designed with a fixed diameter such that the first FSR is larger than 100 GHz. If the length of the common bus waveguide is selected so that the second FSR is equal to the desired channel spacing of 100 GHz (e. g. the second FSR=100 GHz), then individual MRR lasers on the bus can be locked to the respective channel frequencies defined by the second FSR of the bus waveguide. Such setting of the first FSR and the second FSR in addition to the use of the frequency-dependent filter ensures that a single mode (i.e., single frequency) remains prominent per channel, referred to as a single-mode operation.

Additionally, the proposed example optical device uses one or more reflectors on the common bus waveguide to achieve unidirectionality of light propagation inside the MRR laser thereby enhancing the output optical power stability of the optical device.

Referring now to the drawings, in FIG. 1, a top view 100 of an example optical device 102 is presented. The optical device 102 may be a light source, for example, a laser source that may find applications in photonic circuits and that may be capable of generating single mode and unidirectional light output. In particular, the optical device 102 may be implemented in a photonic integrated circuit (see FIG. 9). In one example implementation, the photonic integrated circuit may be implemented in an optical transceiver. The optical transceiver, in some examples, may be used in an electronic system such as but not limited to, computers (stationary or portable), servers, storage systems, wireless access points, network switches, routers, docking stations, printers, or scanners. The optical device 102 of FIG. 1 may include an MRR structure 103 and a common bus waveguide 108.

In the example implementation of FIG. 1, the MRR structure 103 may include an MRR laser 104. For illustration purposes, in FIG. 1, the MRR laser 104 is shown to have a ring shape. However, in some other examples, the MRR laser 104 may also be formed to have a loop of any shape (e.g., circular loop, oval loop, rounded rectangle loop, rounded square loop, rounded triangle loop, etc.), within the purview of the present disclosure. In some examples, an MRR laser having a loop shape that is elongated to have a straight section along one direction (e.g., racetrack-shaped or elongated oval-shaped) is also envisioned within the purview of the present disclosure.

In some examples, the MRR laser 104 may be created by forming an annular waveguide, hereinafter referred to as an MRR cavity, in a device layer (e.g., made of Silicon) of a semiconductor substrate (e.g., a silicon on insulator substrate), and a light-emitting structure over the MRR cavity. In particular, in some examples, an oxide layer may be formed on top of the MRR cavity. Further, a buffer layer (e.g., made of III-V material) may be formed on top of the oxide layer using techniques such as, but not limited to, deposition, wafer bonding, monolithic growth, or other fabrication techniques. Examples of the III-V materials that may be used to form the buffer layer may include, GaAs, Gallium nitride (GaN), Indium nitride (InN), or combinations thereof. The light-emitting structure may be formed over at least a portion of the buffer layer. For example, the light-emitting structure formed in the optical device 102 may be a diode such as a light-emitting diode. In some other examples, the light-emitting structure may include a heterogeneously formed quantum well layer or a quantum dot layer to generate the light.

The light generated via the light-emitting structure of the MRR laser 104 may be coupled into the MRR cavity of the MRR laser 104 and resonates at a resonant frequency (or wavelength) of the MRR cavity, hereinafter referred to as a resonant frequency of the MRR laser 104 or a first resonant frequency. As will be understood, the light generated within the MRR laser may include certain optical modes at frequencies (or wavelengths) other than the resonant frequency. For efficient operation of the optical device, it is useful to minimize such additional optical modes other than the optical mode at the resonant frequency.

The common bus waveguide 108 may be formed adjacent to the MRR laser 104 so that at least a portion of the light generated by the MRR laser 104 is evanescently coupled into the common bus waveguide 108. In particular, the common bus waveguide 108 may be formed proximate to the MRR laser 104 in the device layer of the semiconductor substrate. The common bus waveguide 108 may include a first end 110 and a second end 112. The light generated by the MRR laser 104 may be supplied to other external optical devices via the second end 112 of the common bus waveguide 108. Therefore, it is beneficial to have all the light coupled into the common bus waveguide propagated toward the second end 112. As described earlier, the MRR cavity is annular which may allow light to propagate in a clockwise direction or a counterclockwise direction inside the annular waveguide. Accordingly, both the clockwise propagating and the counterclockwise propagating can couple into the common bus waveguide 108. Especially, the clockwise propagating light may propagate toward the first end 110 when coupled into the common bus waveguide 108.

To enhance the unidirectionality of the light, the optical device 102 may include one or more reflectors formed in the common bus waveguide 108. For example, a first reflector 114 may be formed at the first end 110 of the common bus waveguide 108. The first reflector 114 may reflect the light that is propagating toward the first end 110 (i.e., the clockwise propagating light of the MRR laser 104 that is coupled into the common bus waveguide 108) to propagate toward the second end 112. Accordingly, the light in the common bus waveguide 108 may become unidirectional and exit from the second end 112 and/or be supplied to any external optical device or the optical connectors coupled to the optical device 102 at the second end 112. These optical connectors or other optical devices connected at the second end 112 may also exhibit reflectivity, represented via the use of a second reflector 116. In some other examples, the second reflector 116 may be purposefully formed at the second end 112.

The first reflector 114 may be designed to reflect more light compared to the second reflector 116. In particular, the first reflector 114 may be designed to have a much higher reflectivity compared to the second reflector 116, so that the most all of the light propagating in the clockwise direction coupled into the common bus waveguide 108 is directed to propagate unidirectionally toward the second end 112 of the common bus waveguide 108. The first reflector 114 and the second reflector 116 are hereinafter collectively referred to as reflectors 114 and 116. In some examples, the reflectors 114 and 116 may be implemented as loop mirrors, tear-drop reflectors, etched facets, grating couplers, or combinations thereof.

The formation of the common bus waveguide 108 proximate to the MRR laser 104 causes a formation of an optical coupler 107. In particular, the optical coupler 107 may refer to a region of the optical device 102 where the light generated by the MRR laser 104 evanescently couples into the common bus waveguide 108. As depicted in FIG. 1, in the region of the optical coupler 107, the common bus waveguide 108 is formed proximate to the MRR laser 104 such that the optical coupler 107 has a pre-determined coupling coefficient ($K_1$), hereinafter referred to as, a coupling coefficient $K_1$. The coupling coefficient $K_1$ of the optical coupler 107 may be adjusted by suitably adjusting the distance and/or an overlap length between the MRR laser 104 and the common bus waveguide 108.

Depending on the coupling coefficient $K_1$ of the optical coupler 107 and the resonance condition (described later) of the light in the common bus waveguide 108, a portion of the MRR laser 104, in particular, a region of the MRR cavity along the optical coupler 107, may act as a frequency-dependent coupled cavity filter, hereinafter referred to as a frequency-dependent filter 106. The term "frequency-dependent filter" as used herein may refer to a portion of the MRR cavity along the optical coupler 107 that may attenuate certain frequencies (or wavelengths) of the light generated in the MRR laser 104 (see FIG. 2, for example). The frequency-dependent filter 106 may filter out certain frequencies of the light generated by the MRR laser 104, and depending on the coupling coefficient $K_1$ the rest of the light generated by the MRR laser 104 may be coupled into the common bus waveguide 108. For example, if the coupling coefficient $K_1$ is designed to be 5%, 95% of the light generated by the MRR laser 104 may be coupled into the common bus waveguide 108, if the common bus waveguide 108 does not have any resonance, which may be possible when the there is no reflectivity at the second end 112.

In the present implementation of the optical device 102, the second reflector with non-zero reflectivity is formed at the second end 112 of the common bus waveguide 108 and the first reflector 114 is designed to have substantially higher reflectivity (e.g., more than 10 times higher) compared to that of the second reflector 116. Such, non-zero reflectivity of the second reflector 116 and the first reflector 114 may cause the light inside the common bus waveguide 108 to resonate causing a resonance within the common bus waveguide 108. This resonance inside the common bus waveguide 108 may alter the coupling coefficient $K_1$, causing the optical coupler 107 to operate with an effective coupling coefficient $eK_1$. Due to the resonance inside the common bus waveguide 108, the effective coupling coefficient $eK_1$ becomes a frequency-dependent (or a wavelength-dependent) parameter. For example, when there is a resonance inside the common bus waveguide 108, less light couples into the common bus waveguide 108. In particular, when the light in the common bus waveguide 108 is at resonance, the frequency-dependent filter 106 may cause an increased amount of light to be filtered out, making the transmission of the light into the common bus waveguide 108 lower (i.e., causing more optical losses within the MRR cavity).

When the common bus waveguide 108 is at an anti-resonant frequency, the effective coupling coefficient $eK_1$ becomes smaller, allowing the frequency-dependent filter 106 to cause reduced attenuations (i.e., causing lesser optical losses within the MRR cavity) and pass an increased amount of light to the common bus waveguide 108. In some examples, by suitably positioning the common bus waveguide 108 and the MRR laser 104 relative to each other and controlling the reflectivity of the first reflector 114 and the second reflector 116, the effective coupling coefficient $eK_1$ and hence, the filtering capabilities and frequency selectivity of the frequency-dependent filter 106 may be controlled.

In summary, the effective coupling coefficient $eK_1$ of the optical coupler 107 and hence, an effective coupling loss becomes a function of frequency due to the resonance condition inside the common bus waveguide 108 causing the frequency-dependent filter 106 to selectively filter light depending on frequency/wavelength of the light. In particular, the frequency-dependent filter 106 may filter (i.e., attenuate) the frequencies other than a resonant frequency of the MRR laser 104. Accordingly, the light coupled into the common bus waveguide 108 may have light having prominently the resonant frequency with other frequencies attenuated.

Further, in some examples, the MRR laser 104 is designed (e.g., by selecting specific dimensions, such as the diameter of the MRR laser 104) to achieve a predetermined free spectral range (FSR), hereinafter referred to as a first FSR. Further, the common bus waveguide 108 may be designed (e.g., by selecting a suitable length) so that the common bus waveguide 108 achieves a second FSR. In accordance with examples of the present disclosure, the MRR laser 104 may be designed to achieve the first FSR greater than a channel spacing of the optical device 102, and the common bus waveguide 108 is designed to achieve the second FSR that is substantially equal to the channel spacing. For example, by designing the MRR laser 104 with a fixed diameter such that the first FSR is larger than 100 GHz, and designing the common bus waveguide 108 with the second FSR equal to the desired channel spacing of 100 GHz (e. g. the second FSR=100 GHz), then individual the MRR laser can be locked to a fixed respective channel frequency that may not interfere with other channels if additional MRR lasers are formed with the common bus waveguide 108 (for example, in case of a comb laser). As will be appreciated, such setting of the first FSR and the second FSR in addition to the use of the frequency-dependent filter 106 ensures that a single mode (i.e., single frequency) remains prominent per channel.

Further, in some examples, the MRR laser 104 may include a phase adjustment structure 118 and a gain adjustment structure 120. In some examples, the phase adjustment structure 118 may include a metal heater or a PN junction. Application of electricity to the phase adjustment structure 118 may cause local variations in the charge in the refractive index within the annular waveguide of the MRR laser 104 resulting in the phase shifting of the light within the MRR laser 104. The electricity applied to the phase adjustment structure 118 may be suitably controlled to fine-tune the resonant frequency of the MRR laser 104.

The gain adjustment structure 120 may include a p-i-n junction. The p-i-n junction may include an intrinsic semiconductor material region sandwiched between a p-type semiconductor material region and an n-type semiconductor material region. During operation, upon application of electricity to the gain adjustment structure 120, holes from the p-type semiconductor material region and electrons from the n-type semiconductor material region may be injected into the intrinsic semiconductor material region where the holes and the electrons may recombine. The recombination of the holes and electrons may provide optical gain. The electricity applied to the gain adjustment structure 120 may be suitably controlled to change the optical gain/the intensity of the light generated by the MRR laser.

Figure 2:
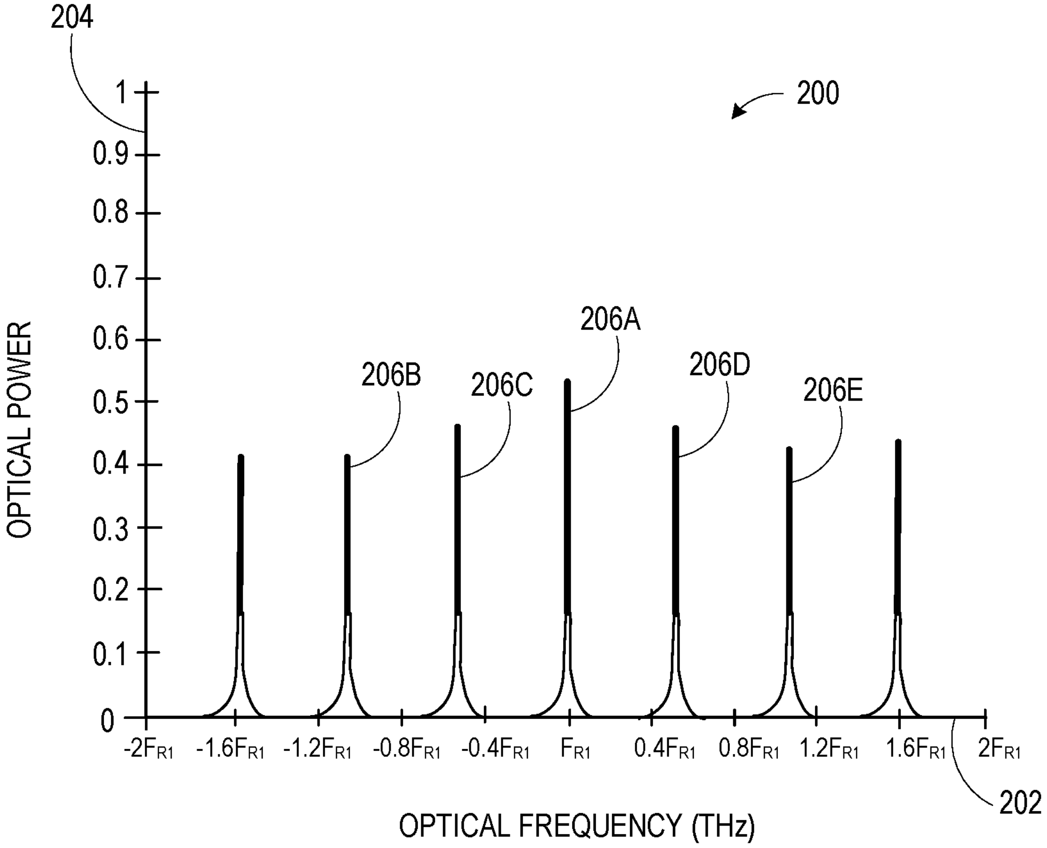
FIG. 2 depicts a graphical representation showing an optical power spectrum of the optical device of FIG. 1.

Referring now to FIG. 2, an example graphical representation 200 depicting an optical power spectrum of an optical device, for example, the optical device 102 of FIG. 1, is depicted. In particular, the graphical representation 200 depicts the spectral representation of an optical power inside the MRR laser 104 of the optical device 102. In the graphical representation 200, the X-axis 202 represents an optical frequency in Terahertz (THz), and the Y-axis 204 represents a normalized optical power (i.e., a value of 1 (one) representing maximum optical power and a value of 0 (zero) representing non-detectable or no optical power). On the X-axis 202. $F_{R1}$ represents the resonant frequency of the MRR laser 104. Curves 206A, 206B, 2060, 206D, and 206E represent optical power corresponding to several optical frequencies, as shown in FIG. 2. In particular, the curve 206A represents an optical power at the resonant frequency $F_{R1}$ of the MRR laser 104. The rest of the curves 206B, 206C, 2060, and 206E represent optical power corresponding to other non-resonant frequencies. It is observed from the graphical representation 200 that optical power at the resonant frequency $F_{R1}$ is greater compared to the optical power at the other non-resonant frequencies. Such attenuation of the optical powers at the other non-resonant frequencies may be achieved due to the formation of the frequency-dependent filter 106 in the MRR laser 104.

Figure 3:
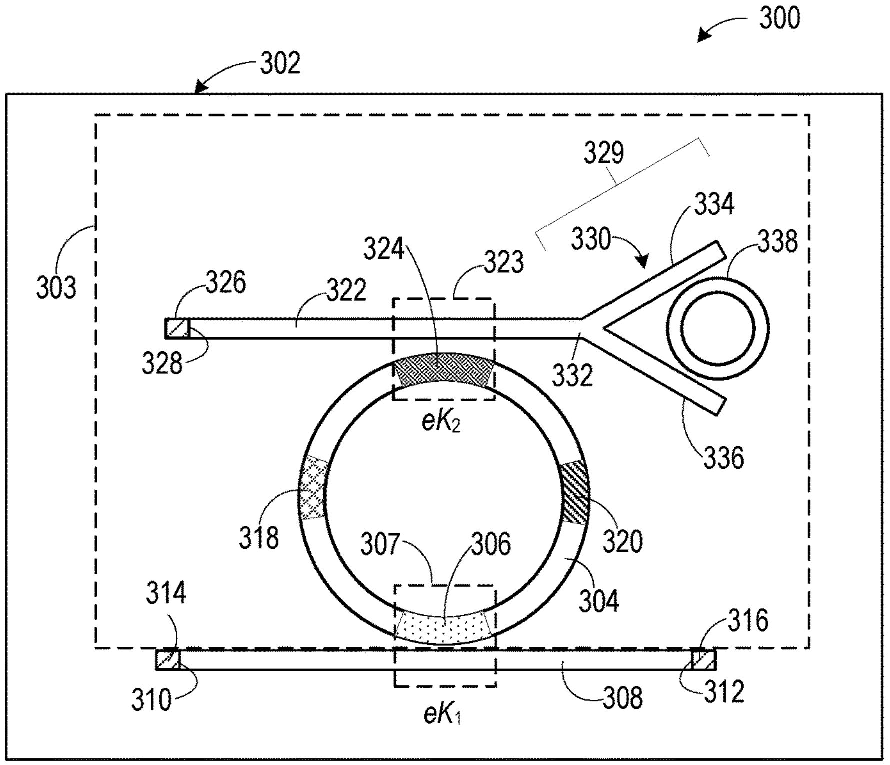
FIG. 3 depicts another example optical device.

Turning now to FIG. 3, a top view 300 of another example optical device 302 is presented. The optical device 302 may be an example representative of the optical device 102 of FIG. 1. Accordingly, the optical device 302 may include several structural components that are similar to those described in conjunction with FIG. 1, certain description of which is not repeated herein for the sake of brevity. For example, the optical device 302 may include an MRR structure 303 and a common bus waveguide 308. The MRR structure 303 may include an MRR laser 304 which includes a frequency-dependent filter 306. Further, the formation of the common bus waveguide 308 adjacent to the MRR laser 304 defines an optical coupler 307. The MRR laser 304, the frequency-dependent filter 306, the optical coupler 307, and the common bus waveguide 308 may have similar characteristics as described in conjunction with the MRR laser 104, the frequency-dependent filter 106, the optical coupler 107, and the common bus waveguide 108, respectively, of FIG. 1.

For illustration purposes, the optical coupler 307 is described to have the effective coupling coefficient $eK_1$ as described in conjunction with FIG. 1. Further, the MRR laser 304 may also include a phase adjustment structure 318 and a gain adjustment structure 320 that may be similar to the phase adjustment structure 118 and the gain adjustment structure 120 of FIG. 1. Also, the common bus waveguide 308 may include reflectors 314 and 316 at ends 310 and 312, respectively, of the common bus waveguide 308. The reflectors 314 and 316 may be respectively similar to the reflectors 114 and 116 of FIG. 1 may aid in enhancing the unidirectionality of the light output of the optical device 302.

In accordance with the examples presented herein, the MRR structure 303 may additionally include another bus waveguide, hereinafter referred to as, an individual waveguide or an MRR-specific bus waveguide 322. The MRR-specific bus waveguide 322 may be placed adjacent to the MRR laser 304 such that another optical coupler 323 may be formed near a region where the MRR-specific bus waveguide 322 is close to the MRR laser 304 and cause evanescent coupling of the light between the MRR laser 304 and the MRR-specific bus waveguide 322. The MRR-specific bus waveguide 322 may be formed proximate to the MRR laser 304 in the device layer of the semiconductor substrate. The frequency-dependent filter 324 may be formed along another portion of the MRR laser 304 different from a portion where the frequency-dependent filter 306 is formed.

Further, the MRR-specific bus waveguide 322 may include reflectors formed at a first end 328 and a second end 332. In particular, the MRR-specific bus waveguide 322 may include a reflector 326 formed at the first end 328. Further, the MRR-specific bus waveguide 322 may have a loop mirror formed 329 via a Y-section 330 formed at the second end 332. The Y-section 330 may include two flange waveguides 334 and 336. Further, the MRR structure 303 includes an annular waveguide 338 in a space between the open ends of the flange waveguides 334 and 336. The Y-section 330 with the annular waveguide 338 may also act as a reflector. Also, the annular waveguide 338 may cause a portion of the light to trap inside the annular waveguide 338 and resonate therein at a resonant frequency of the annular waveguide 338. Accordingly, the annular waveguide 338 may also act as an additional frequency filter.

During the operation of the optical device 302, the MRR laser 304 may generate light. Depending on the effective coupling coefficient $eK_1$, a portion of the light may couple into the common bus waveguide 308 in a similar fashion as described in conjunction with FIG. 1. In addition, a portion of the light generated by the MRR laser 304 may also couple into the MRR-specific bus waveguide 322. Because of the reflections of the light within the MRR-specific bus waveguide 322 due to the reflectivity at the ends 328 and 332 of the MRR-specific bus waveguide 322, there may exist a resonance within the MRR-specific bus waveguide 322. Due to the resonance within the MRR-specific bus waveguide 322, the optical coupler 323 may exhibit an effective coupling coefficient $eK_2$, which is also a function of frequency. This may cause a portion 324 of an MRR cavity of the MRR laser 304 may act as another frequency-dependent filter, hereinafter referred to as frequency-dependent filter 324. The frequency-dependent filter 324 may also act in a similar fashion as the frequency-dependent filter 106 to filter out/attenuate certain frequencies of the light generated by the MRR laser 304 depending on the effective coupling coefficient $eK_2$.

In addition, in some examples, the annular waveguide 338 may also be specifically designed (e.g., by way of selecting suitable dimensions) to filter out specific frequencies. With the help of the filtering via the frequency-dependent filter 324, additional attenuation of certain frequencies other than the resonant frequency of the MRR laser 304 may be achieved, resulting in further improvement in the single mode operation of the optical device 302.

Figure 4:
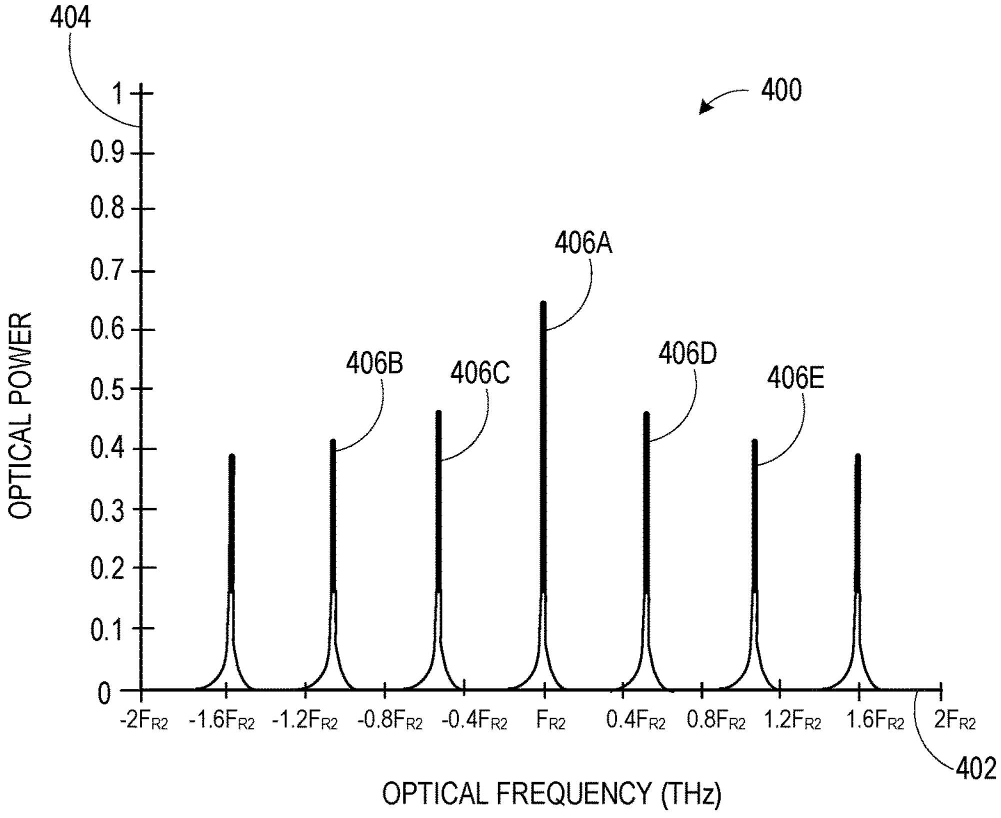
FIG. 4 depicts a graphical representation showing an optical power spectrum of the optical device of FIG. 3.

Referring now to FIG. 4, an example graphical representation 400 depicting an optical power spectrum of an optical device, for example, the optical device 302 of FIG. 3, is depicted. In particular, the graphical representation 400 depicts the spectral representation of an optical power inside the MRR laser 304 of the optical device 302. In the graphical representation 400, the X-axis 402 represents an optical frequency in THz, and the Y-axis 404 represents a normalized optical power (i.e., a value of 1 (one) representing maximum optical power and a value of 0 (zero) representing non-detectable or no optical power). On the X-axis 402. $F_{R2}$ represents the resonant frequency of the MRR laser 304. Curves 406A, 406B, 4060, 406D, and 406E represent optical power corresponding to several optical frequencies, as shown in FIG. 4. In particular, the curve 406A represents an optical power at the resonant frequency $F_{R2}$ of the MRR laser 304. The rest of the curves 406B, 4060, 406D, and 406E represent optical power corresponding to other non-resonant frequencies. It is observed from the graphical representation 400 that optical power at the resonant frequency $F_{R2}$ is greater compared to the optical power at the other non-resonant frequencies. Such attenuation of the optical powers at the other non-resonant frequencies may be achieved due to the formation of the frequency-dependent filter 306 in the MRR laser 304 and the MRR-specific bus waveguide 322. In some examples, the optical device 302 of FIG. 3 may exhibit somewhat better attenuation of optical powers at one or more non-resonant frequencies compared to the optical device 102 of FIG. 1.

Figure 5:
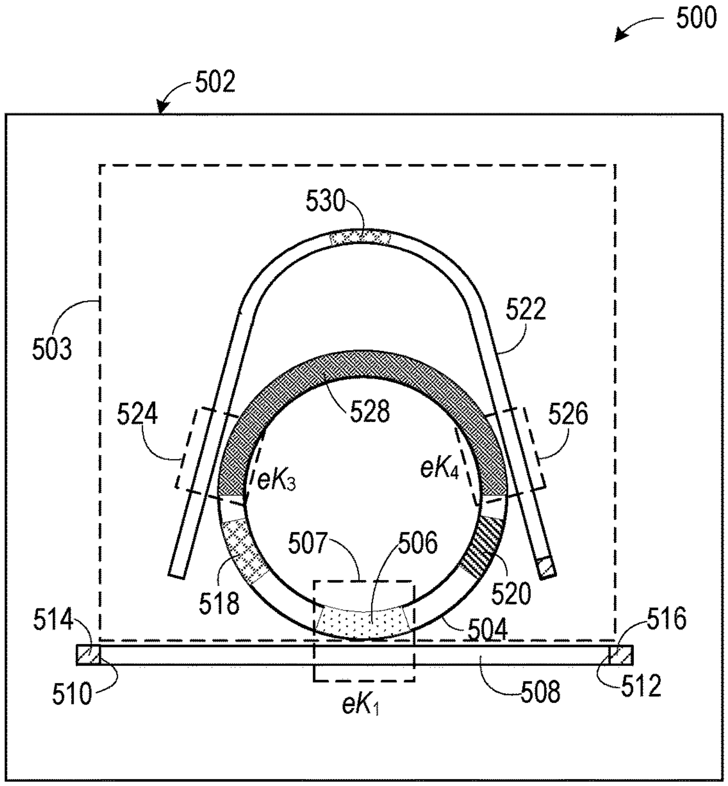
FIG. 5 depicts another example optical device.

Turning now to FIG. 5, a top view 500 of another example optical device 502 is presented. The optical device 502 may be an example representative of the optical device 102 of FIG. 1. Accordingly, the optical device 502 may include several structural components that are similar to those described in conjunction with FIG. 1, certain description of which is not repeated herein for the sake of brevity. For example, the optical device 502 may include an MRR structure 503 and a common bus waveguide 508. The MRR structure 503 may include an MRR laser 504 which includes a frequency-dependent filter 506. Further, the formation of the common bus waveguide 508 adjacent to the MRR laser 504 defines an optical coupler 507. The MRR laser 504, the frequency-dependent filter 506, the optical coupler 507, and the common bus waveguide 508 may have similar characteristics as described in conjunction with the MRR laser 104, the frequency-dependent filter 106, the optical coupler 107, and the common bus waveguide 108, respectively, of FIG. 1. For illustration purposes, the optical coupler 507 is described to have the effective coupling coefficient $eK_1$ as described in conjunction with FIG. 1. Further, the MRR laser 504 may also include a phase adjustment structure 518 and a gain adjustment structure 520 that may be similar to the phase adjustment structure 118 and the gain adjustment structure 120 of FIG. 1. Also, the common bus waveguide 508 may include reflectors 514 and 516 at ends 510 and 512, respectively, of the common bus waveguide 508. The reflectors 514 and 516 may be respectively similar to the reflectors 114 and 116 of FIG. 1 may aid in enhancing the unidirectionality of the light output of the optical device 502.

In accordance with the examples presented herein, the MRR structure 503 may include a Mach Zehnder Interferometer (MZI) waveguide 522 formed in the proximity of the MRR laser 504 such that two additional optical couplers 524 and 526 are formed along different portions of the MRR laser 504. In particular, the MZI waveguide 522 may be an inverted U-shaped waveguide formed adjacent to the MRR laser 504. In particular, MZI waveguide 522 may be formed proximate to the MRR laser 504 in the device layer of the semiconductor substrate.

During the operation of the optical device 502, the MRR laser 504 may generate light. Depending on the effective coupling coefficient $eK_1$, a portion of the light may couple into the common bus waveguide 508 in a similar fashion as described in conjunction with FIG. 1. Due to the formation of the optical couplers 524 and 526, potions of the light may be coupled into the MZI waveguide 522 via both the optical couplers 524 and 526 causing the MRR laser 504 (in particular, an MRR cavity) and the MZI waveguide 522 to act as an MZI. In particular, during operation, the optical couplers 524 and 526 may respectively have effective coupling coefficients $eK_3$ and $eK_4$, which may cause a portion 528 of the MRR laser 504 may act as another frequency-dependent filter, hereinafter referred to as a frequency-dependent filter 528. Due to the operation of the MRR laser 504 and the MZI waveguide 522 as MZI, the frequency-dependent filter 528 attains a sinusoidal loss spectrum allowing a very narrow range of frequency to pass through (i.e., acting as a narrow bandpass optical filter). In some examples, the MZI waveguide 522 may be designed to selectively filter out (i.e., attenuate) frequencies other than the resonant frequency of the light generated by the MRR laser 504. In some examples, the MZI waveguide 522 may include a phase adjustment structure 530 to tune a phase of the loss spectrum thereby allowing the selection of a particular frequency or a frequency range to remain inside the MRR laser 504. With the help of the filtering via the frequency-dependent filter 528 caused via the MZI waveguide 522, additional attenuation of certain frequencies other than the resonant frequency of the MRR laser 504 may be achieved, resulting in further improvement in the single mode operation of the optical device 502.

Figure 6:
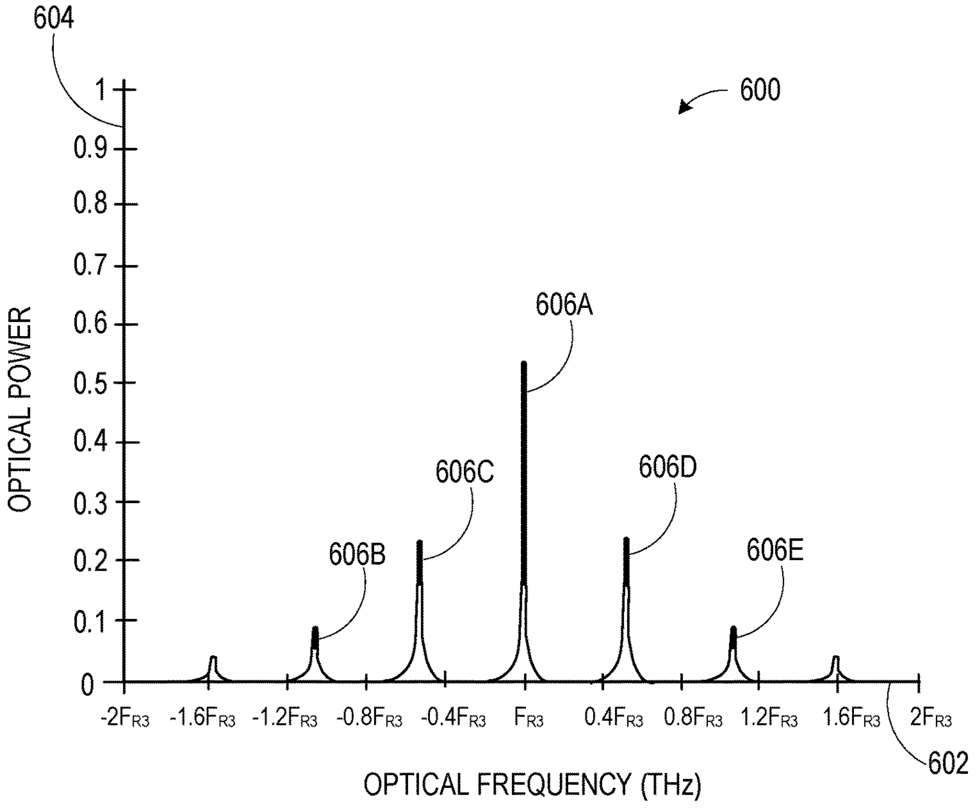
FIG. 6 depicts a graphical representation showing an optical power spectrum of the optical device of FIG. 5.

Referring now to FIG. 6, an example graphical representation 600 depicting an optical power spectrum of an optical device, for example, the optical device 502 of FIG. 5, is depicted. In particular, the graphical representation 600 depicts the spectral representation of an optical power inside the MRR laser 504 of the optical device 502. In the graphical representation 600, the X-axis 602 represents an optical frequency in THz, and the Y-axis 604 represents a normalized optical power (i.e., a value of 1 (one) representing maximum optical power and a value of 0 (zero) representing non-detectable or no optical power). On the X-axis 602, $F_{R3}$ represents the resonant frequency of the MRR laser 504. Curves 606A, 606B, 6060, 606D, and 606E represent optical power corresponding to several optical frequencies, as shown in FIG. 6. In particular, the curve 606A represents an optical power at the resonant frequency $F_{R3}$ of the MRR laser 504. The rest of the curves 606B, 6060, 6060, and 606E represent optical power corresponding to other non-resonant frequencies. It is observed from the graphical representation 600 that optical power at the resonant frequency $F_{R3}$ is greater compared to the optical power at the other non-resonant frequencies. Such attenuation of the optical powers at the other non-resonant frequencies may be achieved due to the formation of the frequency-dependent filters 506 and 528 in the MRR laser 304. In particular, the frequency-dependent filter 528 formed via the MZI waveguide may exhibit a sinusoidal loss spectrum, resulting in enhanced attenuation of the optical power at the non-resonant frequencies.

Figure 7:
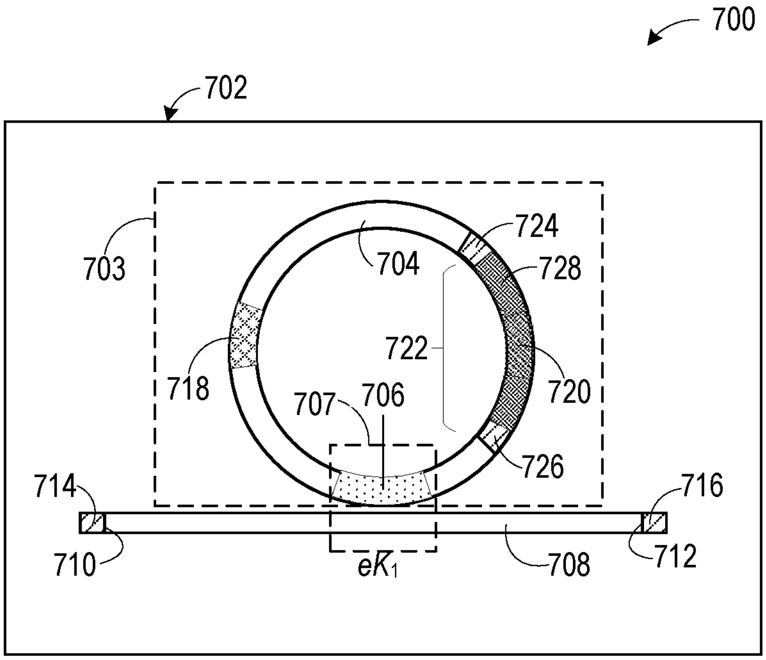
FIG. 7 depicts yet another example optical device.

Referring now to FIG. 7, a top view 700 of another example optical device 702 is presented. The optical device 702 may be an example representative of the optical device 102 of FIG. 1. Accordingly, the optical device 702 may include several structural components that are similar to those described in conjunction with FIG. 1, certain description of which is not repeated herein for the sake of brevity. For example, the optical device 702 may include an MRR structure 703 and a common bus waveguide 708. The MRR structure 703 may include an MRR laser 704 which includes a frequency-dependent filter 706. Further, the formation of the common bus waveguide 708 adjacent to the MRR laser 704 defines an optical coupler 707. The MRR laser 704, the frequency-dependent filter 706, the optical coupler 707, and the common bus waveguide 708 may have similar characteristics as described in conjunction with the MRR laser 104, the frequency-dependent filter 106, the optical coupler 107, and the common bus waveguide 108, respectively, of FIG. 1. For illustration purposes, the optical coupler 707 is described to have the effective coupling coefficient $eK_1$ as described in conjunction with FIG. 1. Further, the MRR laser 704 may also include a phase adjustment structure 718 and a gain adjustment structure 720 that may be similar to the phase adjustment structure 118 and the gain adjustment structure 120 of FIG. 1. Also, the common bus waveguide 708 may include reflectors 714 and 716 at ends 710 and 712, respectively, of the common bus waveguide 708. The reflectors 714 and 716 may be respectively similar to the reflectors 114 and 116 of FIG. 1 may aid in enhancing the unidirectionality of the light output of the optical device 702.

In accordance with the examples presented herein, the optical device the MRR laser 704 includes a Fabry-Perot interferometer 722 formed via pair of reflectors, for example, reflectors 724 and 726. The reflectors 724 and 726 may be formed within the MRR cavity of the MRR laser. In some examples, the reflectors 724 and 726 may be formed as etched facets or gratings.

During the operation of the optical device 702, the MRR laser 704 may generate light. Certain frequencies (e.g., depending on an annular distance between the reflectors 724 and 726) of the light generated by the MRR laser 704 may resonate within the Fabry-Perot interferometer 722 (i.e., in a region between the reflectors 724 and 726). Whereas the rest of the light frequencies may pass through the Fabry-Perot interferometer 722 and propagate inside the MRR cavity of the MRR laser 704. Thus, a portion 728 (i.e., the entire portion of the MRR laser 704 between the reflectors 724 and 726) of the MRR laser 704 may operate as a frequency-dependent filter, referred to as frequency-dependent filter 728. In particular, the distance between the reflectors 724 and 726 may be adjusted such a predetermined range of frequencies may be filtered by the frequency-dependent filter 728 (i.e., resonate inside the Fabry-Perot interferometer 722). Further, a portion of the light propagating inside the MRR cavity may couple into the common bus waveguide 708 depending on the effective coupling coefficient $eK_1$ of the optical coupler 707 in a similar fashion as described in conjunction with FIG. 1. With the help of the filtering via the frequency-dependent filter 728 caused via the Fabry-Perot interferometer 722, additional attenuation of certain frequencies other than the resonant frequency of the MRR laser 704 may be achieved, resulting in further improvement in the single mode operation of the optical device 702.

Figure 8:
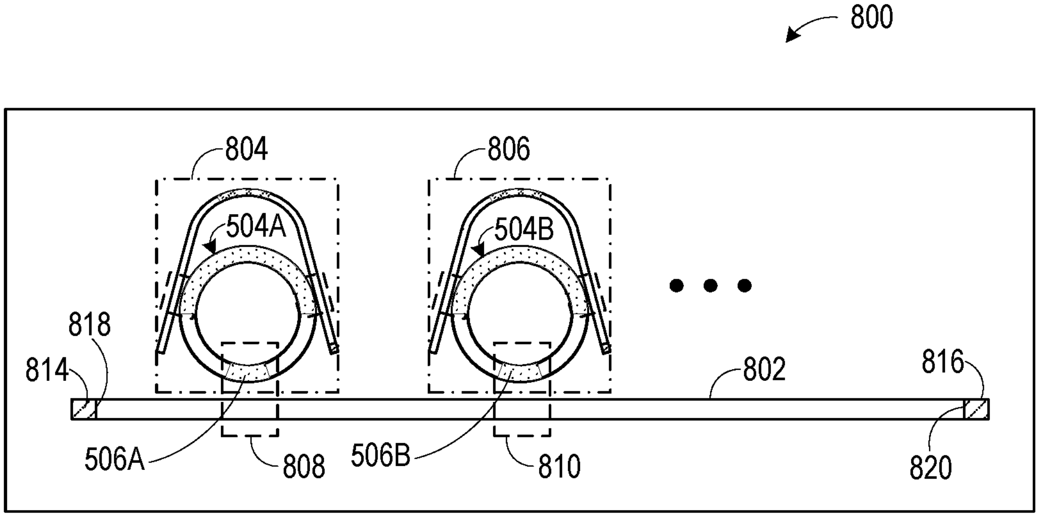
FIG. 8 depicts an example laser source.

Turning now to FIG. 8, another example optical device such as a laser source 800 is depicted. The example laser source 800 presented in FIG. 8 may be a comb laser, in one example. The laser source 800 may include a common bus waveguide 802 and a plurality of MRR structures, for example, a first MRR structure 804 and a second MRR structure 806, hereinafter collectively referred to as MRR structures 804 and 806. The MRR structures 804 and 806 may be representative of any or combinations of the MRR structures 103, 303, 503, or 703 described in earlier drawings. The MRR structures 804 and 806 may be formed adjacent to the common bus waveguide 802 as if any of the MRR structures 103, 303, 503, or 703 are disposed relative to the common bus waveguides 108, 308, 508, or 708, respectively, as described earlier. For illustration purposes, the MRR structures 804 and 806 are represented as the example MRR structure 503 of FIG. 5. Accordingly, the same internal reference numerals have been reused in FIG. 8 with suffixes CA' (for MRR structures 804) and CB' (for MRR structures 806) with respective reference numerals. Further, in FIG. 8, two MRR structures 804 and 806 are shown for illustration purposes, in some examples, the laser source 800 may include more than two MRR structures formed proximate to the common bus waveguide 802.

As shown in FIG. 8, each of the MRR structures 804 and 806 may include respective MRR lasers, for example, the MRR lasers 504A and 504B that are similar to the MRR laser 504 of FIG. 5. As described earlier, these MRR lasers 504A and 504B may include frequency-dependent filters 506A and 506B, respectively, formed via the optical couplers 808 and 810. The optical couplers 808 and 810 may be example representative of the optical couplers 107 and 507 described earlier. The frequency-dependent filters 506A and 506B may act in a similar fashion as that of the frequency-dependent filter 106 described in conjunction with FIG. 1.

In some examples, the MRR laser 504A may be designed to have the first resonant frequency and the MRR laser 504B may be designed to have a second resonant frequency offset from the first resonant frequency. In certain examples, the MRR lasers 504A and 504B may be designed to have the same diameter and the frequency offset in the second resonant frequency may be achieved by tuning the respective phase adjustment structure (not depicted in FIG. 8 for simplicity of illustration). In certain examples, the MRR laser 504B may be designed to have a different diameter compared to the MRR laser 504A to achieve the second resonant frequency that is different from the first resonant frequency of the MRR laser 504A.

In some examples, the MRR laser 504A may be designed (e.g., by selecting specific dimensions, such as the diameter of the MRR laser) to achieve a first free spectral range (FSR). Further, the common bus waveguide 802 may be designed (e.g., by selecting a suitable length) to achieve a second FSR. In accordance with examples of the present disclosure, the MRR laser 504A may be designed to achieve the first FSR greater than a channel spacing of the optical device (e.g., the laser source 800). The channel spacing in the context of FIG. 8, may refer to a frequency difference between the operating frequencies of the communication channels of the laser source 800. In the example implementation of FIG. 8, one communication channel may correspond to the first MRR structure 804 and the other may correspond to the first MRR structure 806.

Further, the common bus waveguide 802 may be designed to achieve the second FSR that is substantially equal to the channel spacing. For example, the MRR laser 504A of the first MRR structure 804 may be designed with a fixed diameter smaller than 251.3 micrometers (μm) such that the first FSR is larger than 100 GHz. If the length of the common bus waveguide 802 is selected so that the second FSR is equal to the desired channel spacing of 100 GHz (e. g., the second FSR=100 GHz by choosing the length of the common bus waveguide 802 as 394.7 μm), then individual MRR laser 504B of the other MRR structure 804 (or any other MRR laser of the additional MRR structures, if any, in a laser source) can be locked to the respective channel frequencies defined by the second FSR of the common bus waveguide 802. Such setting of the first FSR and the second FSR in addition to the use of the frequency-dependent filters in the laser source 800 ensures that a single mode (i.e., single frequency) remains prominent per channel, referred to as a single-mode operation.

In one example implementation, the MRR laser 504A of the first MRR structure 804 may be designed to have the first FSR greater than the second FSR multiplied by a sum of the additional MRR lasers (e.g., the MRR laser 504B) and the MRR laser 504A, which is two (2) in the example implementation of FIG. 8. For example, the MRR laser 504A may be designed to have the first FSR that is greater than 200 GHz (i.e., >2*100 GHz). For example, the MRR laser 504A of a diameter smaller than 125.6 μm may be used to achieve the first FSR greater than 200 GHz. In an example implementation in which a laser source includes 4 MRR lasers former proximate to a common bus waveguide and a required channel spacing is 100 GHz, the FSR of the common bus waveguide may be set to 100 GHz, and the FSR of one MRR laser may be set to a value greater than 400 GHz (e.g., by choosing the diameter smaller than 62.8 μm), the remaining three MRR lasers may be locked to respective resonant frequencies. Such setting of the FSRs of the MRR laser and the common bus waveguide may greatly reduce interference between frequencies of the MRR lasers and light in the common bus waveguide may include increased power corresponding to the resonant frequencies of each of the four MRR lasers separated by the channel spacing.

Further, to enhance the unidirectionality of the light generated by the laser source 800, the common bus waveguide 802 may include one or more reflectors, for example, a first reflector 814 at a first end 818, and a second reflector 816 a first end 820 of the common bus waveguide 802. The reflectors 814 and 816 may be example representative of the reflectors 114 and 116 of FIG. 1 and may aid in producing unidirectional light as described in conjunction with FIG. 1.

Figure 9:
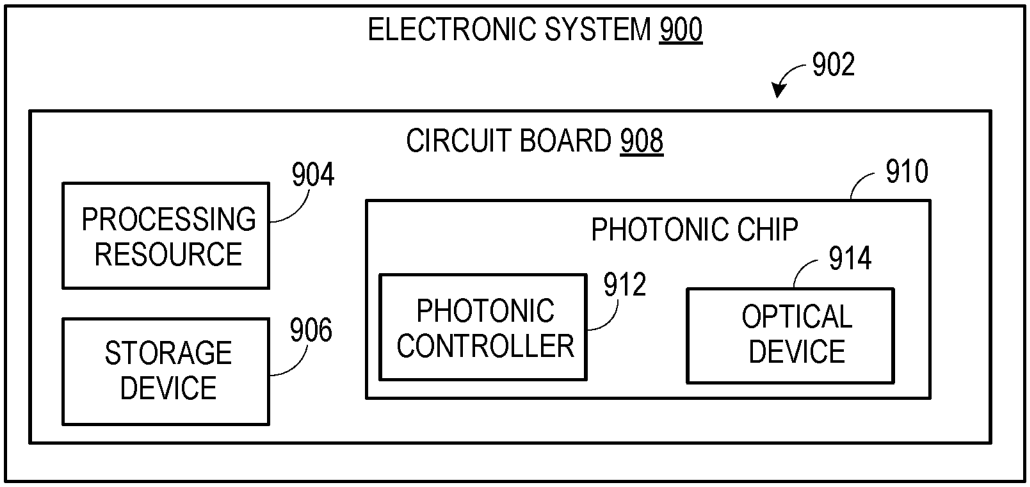
FIG. 9 depicts a block diagram of an example electronic system hosting an example optical device.

Referring now to FIG. 9, a block diagram of an example electronic system 900 is presented. Examples of the electronic system 900 may include, but are not limited to, computers (stationary or portable), servers, storage systems, wireless access points, network switches, routers, docking stations, printers, or scanners. The electronic system 900 may be offered as a stand-alone product, a packaged solution, and can be utilized on a one-time full product/solution purchase or pay-per-use basis. The electronic system 900 may include one or more multi-chip modules, for example, a multi-chip module (MCM) 902 to process and/or store data. In some examples, the MCM 902 may include a processing resource 904 and a storage medium 906 mounted on a circuit board 908. Also, in some examples, the MCM 902 may host a photonic integrated circuit 910 on the circuit board 908. In some other examples, one or more of the processing resource 904, the storage medium 906, and the photonic integrated circuit 910 may be hosted on separate MCM (not shown). The circuit board 908 may be a printed circuit board (PCB) that includes several electrically conductive traces (not shown) to interconnect the processing resource 904, the storage medium 906, and the photonic integrated circuit 910 with each other and/or with other components disposed on or outside of the PCB.

The processing resource 904 may be a physical device, for example, one or more central processing units (CPUs), one or more semiconductor-based microprocessors, microcontrollers, one or more graphics processing units (GPUs), application-specific integrated circuits (ASICs), a field-programmable gate arrays (FPGAs), other hardware devices, or combinations thereof, capable of retrieving and executing the instructions stored in the storage medium 906. The processing resource 904 may fetch, decode, and execute the instructions stored in the storage medium 906. As an alternative or in addition to executing the instructions, the processing resource 904 may include at least one integrated circuit (IC), control logic, electronic circuits, or combinations thereof that include a number of electronic components. The storage medium 906 may be any electronic, magnetic, optical, or any other physical storage device that contains or stores instructions that are readable and executable by the processing resource 904. Thus, the storage medium 906 may be, for example, Random Access Memory (RAM), non-volatile RAM (NVRAM), an Electrically Erasable Programmable Read-Only Memory (EEPROM), a storage device, an optical disc, and the like. In some embodiments, the storage medium 906 may be a non-transitory storage medium, where the term "non-transitory" does not encompass transitory propagating signals.

Further, in some examples, the photonic integrated circuit 910 may include a photonics controller 912 and one or more photonic devices such as the optical device 914. The optical device 914 may be an example representative of any of the optical device 102 of FIG. 1, the optical device 302 of FIG. 3, the optical device 502 of FIG. 5, the optical device 702 of FIG. 7, or the laser source 800 of FIG. 8. In some examples, the optical device 914 may include several of the optical device 102, 302, 502, and/or 702. For illustration purposes, in FIG. 6, the photonic integrated circuit 910 is shown to include a single optical device 914. The use of a different number of optical devices or the use of several different types of optical devices in the photonic integrated circuit 910 is also envisioned within the scope of the present disclosure. For example, the photonic integrated circuit 910 may also include other photonic devices such as but not limited to, optical converters, optical cables, waveguides, optical modulators (e.g., ring modulator), optical demodulators (e.g., ring demodulator), resonators, light sources (e.g., lasers), or the like. The photonic integrated circuit 910 may function as an optical transmitter, optical transceiver, optical communication and/or processing medium for the data and control signals (e.g., control voltages) received from the photonics controller 912. The photonics controller 912 may be implemented using an IC chip such as, but not limited to, an ASIC, an FPGA chip, a processor chip (e.g., CPU and/or GPU), a microcontroller, or a special-purpose processor. During the operation of the electronic system 900, the photonics controller 912 may apply control voltages to operate the optical device 914.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled to" as used herein, is defined as connected, whether directly without any intervening elements or indirectly with at least one intervening element, unless indicated otherwise. For example, two elements may be coupled to each other mechanically, electrically, optically, or communicatively linked through a communication channel, pathway, network, or system. Further, the term "and/or" as used herein refers to and encompasses any and all possible combinations of the associated listed items. It will also be understood that, although the terms first, second, third, fourth, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While certain implementations have been shown and described above, various changes in form and details may be made. For example, some features and/or functions that have been described in relation to one implementation and/or process may be related to other implementations. In other words, processes, features, components, and/or properties described in relation to one implementation may be useful in other implementations. Furthermore, it should be appreciated that the systems and methods described herein may include various combinations and/or sub-combinations of the components and/or features of the different implementations described. Moreover, method blocks described in various methods may be performed in series, parallel, or a combination thereof. Further, the method blocks may as well be performed in a different order than depicted in flow diagrams.

Further, in the foregoing description, numerous details are set forth to provide an understanding of the subject matter disclosed herein. However, an implementation may be practiced without some or all of these details. Other implementations may include modifications, combinations, and variations from the details discussed above. It is intended that the following claims cover such modifications and variations.

What is claimed is:

1. An optical device comprising:

a first microring resonator (MRR) laser having a first resonant frequency and a first free spectral range (FSR), wherein the first FSR is greater than a channel spacing of the optical device;

a first frequency-dependent filter formed along a portion of the first MRR laser via a common bus waveguide to attenuate one or more frequencies different from the first resonant frequency, wherein a length of the common bus waveguide is chosen to achieve a second FSR of the common bus waveguide to be substantially equal to the channel spacing to enable a single-mode operation for the optical device;

a first reflector formed at a first end of the common bus waveguide to enhance a unidirectionality of optical signal within the first MRR laser; and one or more additional MRR lasers and respective frequency-dependent filters created via the common bus waveguide, wherein the first MRR laser is designed to have the first FSR greater than the second FSR multiplied by a sum of the additional MRR lasers and the first MRR laser.

2. The optical device of claim 1, wherein the first MRR laser is designed to have a predetermined diameter to achieve the first FSR.

3. The optical device of claim 1, wherein the additional MRR lasers are tuned to respective resonant frequencies that are different from the first resonant frequency of the first MRR laser, wherein, due to the second FSR being substantially equal to the channel spacing, interference between frequencies of the additional MRR lasers and the first MRR laser is minimized and light in the common bus waveguide comprises increased power corresponding to the first resonant frequency and the resonant frequencies corresponding to the additional MRR lasers separated by the channel spacing.

4. The optical device of claim 1, further comprises a second reflector formed at a second end of the common bus waveguide.

5. The optical device of claim 4, wherein the first reflector is designed to reflect more light compared to the second reflector.

6. The optical device of claim 1, further comprising a second frequency-dependent filter formed along another portion of the first MRR laser via an MRR-specific bus waveguide formed proximate to the first MRR laser, wherein the second frequency-dependent filter further attenuates one or more frequencies different from the first resonant frequency.

7. The optical device of claim 6, further comprising a reflector formed at an end of the MRR-specific bus waveguide.

8. The optical device of claim 7, wherein the reflector is an MRR loop mirror.

9. The optical device of claim 1, further comprising a third frequency-dependent filter along a portion of the first MRR laser to enhance attenuation of one or more frequencies other than the first resonant frequency.

10. The optical device of claim 9, wherein the third frequency-dependent filter is formed via a Mach Zehnder Interferometer (MZI) waveguide formed proximate to the first MRR laser.

11. The optical device of claim 1, wherein the first MRR laser comprises a fourth frequency filter formed via a Fabry-Perot interferometer formed along a portion of the first MRR laser, wherein the fourth frequency filter enhances attenuation of one or more frequencies other than the first resonant frequency.

12. A comb laser comprising:

a first MRR laser having a first resonant frequency and a first FSR, wherein the first FSR is greater than a channel spacing of the comb laser;

a second MRR laser having a second resonant frequency offset from the first resonant frequency;

a first frequency-dependent filter formed along a portion of the first MRR laser via a common bus waveguide to attenuate one or more frequencies different from the first resonant frequency;

a second frequency-dependent filter formed along a portion of the second MRR laser via the common bus waveguide to attenuate one or more frequencies different from the second resonant frequency, wherein the first MRR laser and the second MRR laser are formed adjacent to the common bus waveguide, and wherein a length of the common bus waveguide is chosen to achieve a second FSR of the common bus waveguide to be substantially equal to the channel spacing to enable a single-mode operation for the comb laser; and a first reflector formed at a first end of the common bus waveguide to enhance a unidirectionality of optical signals within the first MRR laser and the second MRR laser.

13. The comb laser of claim 12, wherein the first MRR laser is designed to have a predetermined diameter to achieve the first FSR.

14. The comb laser of claim 12, wherein the first FSR is greater than double the second FSR.

15. The comb laser of claim 12, wherein, due to the second FSR being substantially equal to the channel spacing, interference between frequencies of optical signals in the first MRR laser and the second MRR laser is minimized and light in the common bus waveguide comprises increased power corresponding to the first resonant frequency and the second resonant frequency separated by the channel spacing.

16. The comb laser of claim 12, further comprises a second reflector formed at a second end of the common bus waveguide, wherein the first reflector is designed to reflect more light compared to the second reflector.

17. An optical device comprising:

a first microring resonator (MRR) laser having a first resonant frequency and a first free spectral range (FSR), wherein the first FSR is greater than a channel spacing of the optical device;

a first frequency-dependent filter formed along a portion of the first MRR laser via a common bus waveguide to attenuate one or more frequencies different from the first resonant frequency, wherein a length of the common bus waveguide is chosen to achieve a second FSR of the common bus waveguide to be substantially equal to the channel spacing to enable a single-mode operation for the optical device;

a first reflector formed at a first end of the common bus waveguide to enhance a unidirectionality of optical signal within the first MRR laser; and one or more additional MRR lasers and respective frequency-dependent filters created via the common bus waveguide, wherein the first MRR laser is designed to have the first FSR greater than the second FSR, and wherein the additional MRR lasers are tuned to respective resonant frequencies that are different from the first resonant frequency of the first MRR laser.

18. The optical device of claim 17, further comprising a second reflector formed at a second end of the common bus waveguide, wherein the first reflector is designed to reflect more light compared to the second reflector.

* * * * *